US010637770B2

(12) United States Patent
Seetharaman et al.

(10) Patent No.: US 10,637,770 B2
(45) Date of Patent: Apr. 28, 2020

(54) METHOD AND SYSTEM FOR OPTIMIZING SERVICE FUNCTION PATHS ASSOCIATED WITH COMMON SERVICE FUNCTIONS

(71) Applicant: WIPRO LIMITED, Bangalore (IN)

(72) Inventors: Swaminathan Seetharaman, Chennai (IN); Ravi Kumar Emani, Bangalore (IN)

(73) Assignee: Wipro Limited, Bangalore (IN)

( * ) Notice: Subject to any disclaimer, the term of this patent is extended or adjusted under 35 U.S.C. 154(b) by 100 days.

(21) Appl. No.: 15/940,603

(22) Filed: Mar. 29, 2018

(65) Prior Publication Data

US 2019/0306051 A1    Oct. 3, 2019

(30) Foreign Application Priority Data

Mar. 29, 2018    (IN) .............................. 201841011962

(51) Int. Cl.
| | |
|---|---|
| *H04L 12/707* | (2013.01) |
| *H04L 12/721* | (2013.01) |
| *H04L 12/24* | (2006.01) |
| *H04L 12/715* | (2013.01) |

(52) U.S. Cl.
CPC .......... *H04L 45/22* (2013.01); *H04L 41/0816* (2013.01); *H04L 41/0823* (2013.01); *H04L 45/124* (2013.01); *H04L 45/14* (2013.01); *H04L 45/64* (2013.01)

(58) Field of Classification Search
None
See application file for complete search history.

(56) References Cited

U.S. PATENT DOCUMENTS

| 9,491,094 B2 * | 11/2016 | Patwardhan | ............ H04L 45/44 |
| 2017/0093658 A1 * | 3/2017 | Ryan | ...................... H04L 43/067 |
| 2019/0014496 A1 * | 1/2019 | Kim | ........................ H04L 45/38 |

* cited by examiner

*Primary Examiner* — Lonnie V Sweet
(74) *Attorney, Agent, or Firm* — Finnegan, Henderson, Farabow, Garrett & Dunner, LLP

(57) ABSTRACT

A method and system for optimizing SFPs associated with common service functions is disclosed. The method includes identifying at least one proposed modification to a target SFP. The method further includes determining at least one associated SFP impacted. The method includes determining at least one impact on each of the at least one associated SFP. The method includes optimizing the at least one impact on each of the at least one associated SFP to generate an optimized set of impacts. The method includes determining at least one action associated with each impact in the optimized set of impacts. The method includes optimizing the at least one action associated with each impact in the optimized set of impacts to generate an optimized set of actions. The method includes reconfiguring the target SFP based on a proposed modification and triggering, for one or more associated SFPs, an associated optimized set of actions.

20 Claims, 8 Drawing Sheets

METHOD AND SYSTEM FOR OPTIMIZING SERVICE FUNCTION PATHS ASSOCIATED WITH COMMON SERVICE FUNCTIONS

TECHNICAL FIELD

This disclosure relates generally to service function chains and more particularly to method and system for optimizing service function paths associated with common service functions.

BACKGROUND

Service Function Chaining (SFC) is a mechanism in which packets of a flow or session pass through an ordered set of service functions (SFs) (i.e., network elements) for delivery of end-to-end services in compliance to policy and regulatory requirements. Software defined Network (SDN) or Network Function Visualization (NFV) enables dynamic service chaining, in which incoming packets are classified and mapped to the appropriate SFC based on one or more of the following factors including the access type, traffic type, subscriber identity, subscriber category (residential, enterprise, and the like), transport protocol, and the like. Sharing of metadata across SFs as part of the packet headers is done to avoid re-classification after every hop (to determine the next hop) and sharing relevant information (for example, subscriber identity). After each SF in the SFC performs its actions, the packet is forwarded to the next SF in the SFC by examining the metadata in the packet header. This forwarding can be done by a Service Function Forwarder (SFF) or by the SFs themselves.

Some conventional systems propose a mechanism of path optimization in dynamic service chaining by collecting information about the inter-node latency, and then trying to minimize the inter-node latency by choosing appropriate service function instances based on its location in a Service Function Path (SFP), which is an instance of an SFC, taking into consideration any pair-wise dependencies. Some conventional systems propose minimizing on inter-node delay (transmission and execution delay). However, these do not consider insertion and removal of SFs from the SFP to optimize performance and usage of network resources.

Some conventional systems propose a mechanism of dynamic and context-aware service chaining. These propose a flexible service function template containing mandatory and optional service functions, and the conditions for inclusion or exclusion of the optional service functions. These further propose a method of inclusion or removal of optional service functions based on estimated network conditions, estimated SFP performance (QoS parameters and the latency associated with the SFP) and/or based on changes in network context (for example, location of end-user(s), access-network type used for the service, or change in session characteristics).

However, these conventional systems fail to consider the impact or cost of the inclusion or exclusion of a SF in the specific SFP (called "primary SFP"). The impact may be on the performance of a set of SFPs (primary and associated SFPs). For example, if an SF instance is included in the primary SFP, it would increase the load of the SF thereby affecting the performance of the primary SFP and/or associated SFP. If an SF instance is excluded from the primary SFP, it could render the location of the SF instance (excluded from primary SFP) inappropriate for associated SFPs. It could also render the location of other SFs in the primary SFP to be inappropriate or non-optimal from the SFP performance point of view.

Additionally, the other drawback is the network resources consumption (change) for the set of SFPs. Inclusion or exclusion of a SF in the primary SFP would increase/decrease the load of the included or excluded SF. Another drawback is related to the network traffic (any destabilization, and the like) in the set of SFPs. For example, inclusion of the SF in the primary SFP may result in scaling up of the SF and/or load-balancing across different SF instances, thereby impacting associated SFPs which contain that SF due to this change (example, out of sequence packets, packet drops, throughput decrease, and the like).

SUMMARY

In one embodiment, a method of optimizing Service Function Paths (SFPs) associated with common service functions is disclosed. The method includes identifying, by a network device, at least one proposed modification to a target SFP in response to a trigger event. The method further includes for each of the at least one proposed modification made to the target SFP, determining, by the network device, at least one associated SFP impacted by an associated proposed modification, wherein the at least one associated SFP comprises at least one common service function with the target SFP. The method includes determining, by the network device, at least one impact on each of the at least one associated SFP impacted by an associated proposed modification from the at least one proposed modification. The method further includes optimizing, by the network device, the at least one impact on each of the at least one associated SFP based on predefined impact criteria to generate an optimized set of impacts for each of the at least one associated SFP. The method includes determining, by the network device, at least one action associated with each impact in the optimized set of impacts for each of the at least one associated SFP. The method includes for each of the at least one associated SFP, optimizing, by the network device, the at least one action associated with each impact in the optimized set of impacts based on predefined action criteria to generate an optimized set of actions for each of the at least one associated SFP. The method further includes reconfiguring, by the network device, the target SFP based on a proposed modification from the at least one proposed modification and triggering, for one or more of the at least one associated SFP, an associated optimized set of actions corresponding to the proposed modification.

In another embodiment, a network device for optimizing SFPs associated with common service functions is disclosed. The network device includes a processor and a memory communicatively coupled to the processor, wherein the memory stores processor instructions, which, on execution, causes the processor to identify at least one proposed modification to a target Service Function Path (SFP) in response to a trigger event. The processor instructions further cause the processor to determine, for each of the at least one proposed modification made to the target SFP, at least one associated SFP impacted by an associated proposed modification, wherein the at least one associated SFP comprises at least one common service function with the target SFP. The processor instructions cause the processor to determine at least one impact on each of the at least one associated SFP impacted by an associated proposed modification from the at least one proposed modification. The processor instructions further cause the processor to optimize the at least one impact on each of the at least one associated SFP based on predefined impact criteria to generate an optimized set of impacts for each of the at least one associated SFP. The processor instructions further cause the processor to determine at least one action associated with each impact in the optimized set of impacts for each of the at least one associated SFP. The processor instructions cause the processor to optimize, for each of the at least one associated SFP, the at least one action associated with each impact in the optimized set of impacts based on predefined action criteria to generate an optimized set of actions for each of the at least one associated SFP. The processor instructions further cause the processor to reconfigure the target SFP based on a proposed modification from the at least one proposed modification and triggering, for one or more of the at least one associated SFP, an associated optimized set of actions corresponding to the proposed modification.

In yet another embodiment, a non-transitory computer-readable storage medium is disclosed. The non-transitory computer-readable storage medium having stored thereon, a set of computer-executable instructions causing a computer comprising one or more processors to perform steps comprising identifying at least one proposed modification to a target Service Function Path (SFP) in response to a trigger event; for each of the at least one proposed modification made to the target SFP, determining at least one associated SFP impacted by an associated proposed modification, wherein the at least one associated SFP comprises at least one common service function with the target SFP; determining at least one impact on each of the at least one associated SFP impacted by an associated proposed modification from the at least one proposed modification; optimizing the at least one impact on each of the at least one associated SFP based on predefined impact criteria to generate an optimized set of impacts for each of the at least one associated SFP; determining at least one action associated with each impact in the optimized set of impacts for each of the at least one associated SFP; for each of the at least one associated SFP, optimizing the at least one action associated with each impact in the optimized set of impacts based on predefined action criteria to generate an optimized set of actions for each of the at least one associated SFP; and reconfiguring the target SFP based on a proposed modification from the at least one proposed modification and triggering, for one or more of the at least one associated SFP, an associated optimized set of actions corresponding to the proposed modification.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
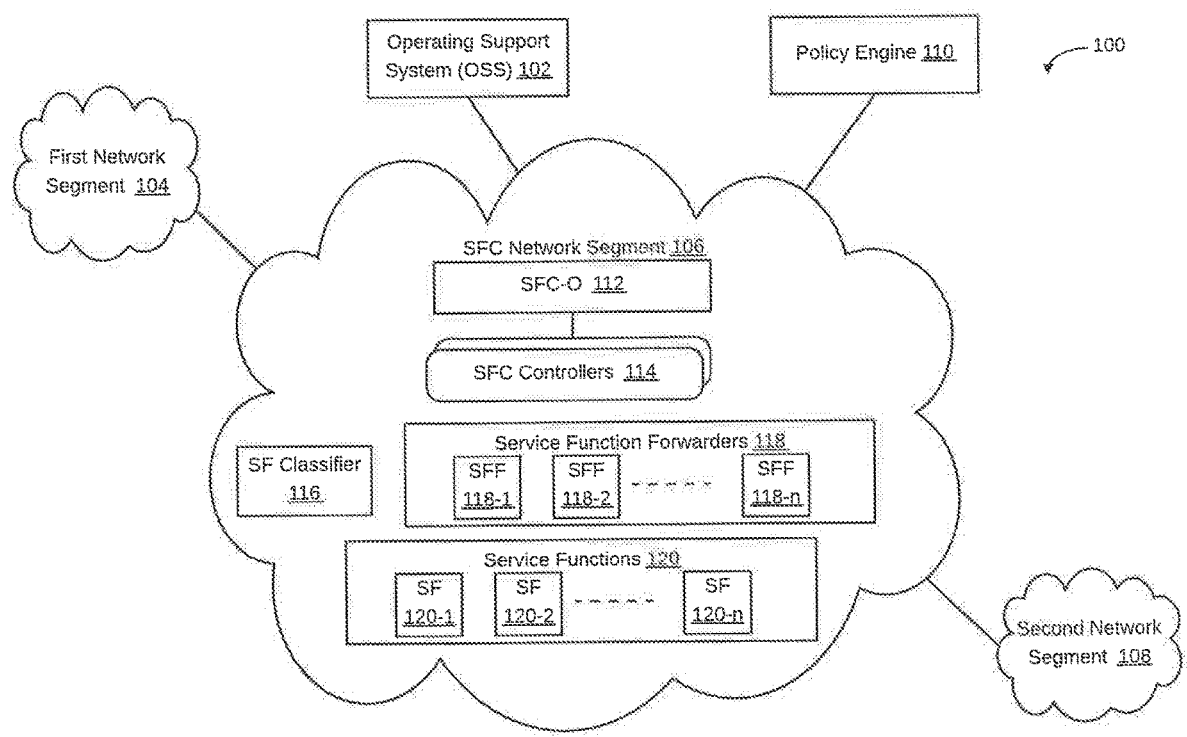
FIG. 1 illustrates a block diagram of an environment (that is exemplary) in which various embodiments may be employed.

Referring now to FIG. 1, an environment 100 (that is exemplary) in which various embodiments may be employed. The environment 100 displays a system that may be configured to receive a request for provisioning a Service Function Chain (SFC) of a plurality of Service Functions (SFs). The request may include at least a Flexible SFC Template (FST). The system may be further configured to determine a Service Function Path (SFP) responsive to a receipt of data packets to be transmitted over the network, based on one or more of the FST, a current network context, one or more network estimation inputs, and historical network data. The data packets correspond to a pre-defined flow of data packets. In an embodiment, the data packets may correspond to a voice call, a video session, an audio call, and the like. The system may be further configured to monitor a pre-defined plurality of parameters associated with the SFP and a network context after implementing the SFP. The monitoring corresponds to a periodic monitoring or an aperiodic monitoring. The system may be further configured to identify a requirement for modification of the SFP based on the monitoring of the pre-defined plurality of parameters and SFP modification criteria. The system may be further configured to modify the SFP responsive to the identification. The system may be further configured to monitor the performance of the modified SFP based on one or more of the pre-defined plurality of parameters associated with the modified SFP, the network context after modifying the SFP, and a pre-defined plurality of performance thresholds.

The environment 100 includes a network of devices (for example, a computer, a server, a digital device, a router, a modem, a bridge, a switch, and the like) for processing, storing and sending or receiving various data. In an implementation, the environment 100 may include an Operations Support System (OSS) 102, a first network segment 104, an SFC network segment 106, a second network segment 108, and/or a policy engine 110. The first network segment 104 and the second network segment 108 may correspond to communication networks, such as, wireless access network (WAN), packet core network such as Long Term Evolution (LTE) evolved packet core network, IP multimedia subsystem (IMS) core network, an Internet Protocol (IP) based network, and the like.

The SFC network segment 106 may include a plurality of elements for adaptively performing service function chaining based on network context. In an implementation, the plurality of elements may include an SFC-Orchestrator (SFC-O) 112, one or more SFC-Controllers 114, an SF classifier 116, a plurality of Service Function Forwarders (SFFs) 118, and a plurality of SFs 120. The plurality of SFFs may include SFF 118-1 to 118-n and the plurality of SFs 120 may include SF 120-1 to 120-n.

Each of the computing devices further includes one or more processors and a computer-readable medium (for example, a memory). The computer-readable storage medium stores instructions that, when executed by the one or more processors, cause the one or more processors to perform data reception and transmission in accordance with aspects of the present disclosure. The computer-readable storage medium may also store various data (for example, optimal network path, optimal packet size, data packets, current packet size of a node, etc.) that may be captured, processed, and/or required by the environment 100.

The OSS 102 may include suitable logic, circuitry, interfaces, and/or code for providing inputs for provisioning an SFC of a plurality of SFs 120. Such inputs may include a flexible SFC template (FST), one or more rules and/or one or more thresholds for defining operations of an SFC. The aforementioned inputs may be provided to the SFC-O 112, via the first network segment 104 or the second network segment 108. In an embodiment, the aforementioned inputs may be provided to the SFC-O 112 directly.

The first network segment 104 and the second network segment 108 may include a medium through which the OSS 102, the policy engine 110, and/or the plurality of elements of the SFC network segment 106 may communicate to each other. Examples of the first network segment 104 and the second network segment 108 may include, but are not limited to, the Internet, a cloud network, a Wireless Fidelity (Wi-Fi) network, a Wireless Local Area Network (WLAN), a Local Area Network (LAN), a telephone line (POTS), Long Term Evolution (LTE), and/or a Metropolitan Area Network (MAN). Various devices in the environment 100 may be configured to connect to the first network segment 104 and/or the second network segment 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

The policy engine 110 may include suitable logic, circuitry, interfaces, and/or code for storing and providing one or more policy rules related to management of a lifecycle of an SFC. The stored one or more policy rules may further pertain to scaling the provisioned SFC, and/or selection of SFs for the SFC. Examples of such policy rules include, but are not limited to, instantiating a new instance of a specific SF when the traffic matching the SFC exceeds a certain threshold (for example, packets or sessions per second), selection of the instance of a specific SF (for example, an SF having an interface to Lawful Interception Gateway (LIG)) such that it is in the same geographical area/region as that of the access network (regulatory policy), and the like. The aforementioned one or more policy rules may be provided to the SFC-O 112, via the first network segment 104 or the second network segment 108. In an embodiment, the aforementioned inputs may be provided to the SFC-O 112 directly.

The SFC-O 112 of the SFC network segment 106 may include suitable logic, circuitry, interfaces, and/or code for management of an SF catalogue, tracking the availability status of SFs that are present in the SFC network segment 106. In an implementation the SF catalogue includes details such as SF instances that are active and/or geographical location of the SF instances that are active. The SFC-O 112 may interpret the FST received from the OSS 102 and based on the interpretation, instruct the SFC-Controller 114 to provision an SFC. The SFC-O 112 may determine SFP, providing relevant inputs to the SFC-Controller 114 for programming the SF classifier 116 and one or more SFFs of the plurality of SFFs 118. The SFC-O 112 may monitor the performance of SFPs and modify the SFPs based on the monitoring, and/or perform SFP lifecycle management.

The SFC-Controller 114 of the SFC network segment 106 may include suitable logic, circuitry, interfaces, and/or code for generating one or more instructions for the SF classifier 116 and the one or more SFFs of plurality of SFFs 118 for performing SF chaining. Such instructions may include rules for classifying a packet and mapping it to one or more pre-defined flows, SFP-related instructions, performance and other SFP related data to be reported to the SFC-Controller 114, and the like. The SFC-Controller 114 may transmit information received from one or more SFFs of the plurality of SFFs 118 and/or the SF classifier 116 to the SFC-O 112. In other words, the SFC-Controller 114 may be configured to carrying out relevant control-plane functions for SFC operation.

The SF classifier 116 of the SFC network segment 106 may include suitable logic, circuitry, interfaces, and/or code for classifying packets into a flow based on the instructions received from the SFC-Controller 114 which is, in turn, provided by the SFC-O 112 based on the FST. The classification includes mapping a packet (of a pre-defined flow of packets) to an appropriate SFC based on a plurality of pre-defined factors such as access network type, user category (for example, enterprise, residential), type of a user (for example an adult, adolescent, and child), application type and requirements, location of the served user, policy requirements, and the like.

The plurality of SFFs 118 may include suitable logic, circuitry, interfaces, and/or code for tracking the flow of packets through a determined SFP. The plurality of SFFs 118 may determine a next hop of the packet of a particular flow based on the SFP. The plurality of SFFs 118 may detect and terminate SFC that have loops. The plurality of SFFs 118 may remove any SFC-related packet headers before sending the packets to any node or a network that is beyond the SFC (outside the domain of the SFC). The plurality of SFFs 118 may report SFP related performance and other data to the SFC-Controller 114. The plurality of SFFs 118 may perform load balancing for the plurality of SFs 120.

The plurality of SFs 120 may include suitable logic, circuitry, interfaces, and/or code for performing one or more network functions such as, one or more function relating to Firewall (selectively block certain type of traffic, traffic coming from certain IP addresses, and the like.) Network Address Translation (NAT), video optimization, Transfer Control Protocol (TCP) optimization, content caching, Packet Gateway (PGW) functions, Serving Gateway (SGW) functions, Deep Packet Inspection (DPI), web content filtering, parental controls, encryption, and the like. The plurality of SFs 120 may be physical network entities (NEs) or virtual NEs. The plurality of SFs 120 may be configured to process the packets normally, however in case the SFs correspond to SFC-aware SFs, the SF may modify the SFC-header in the packet. In an implementation, the SFC-aware SFs may correspond to SFs that are aware of application of SFC, and consume and/or modify information shared in SFC-related packet headers in the packets. In other words, they are able to handle packets containing SFC headers. Such SFs may be in accordance with IETF RFC 7665 "Service Function Chaining (SFC) Architecture". In another embodiment, the SFC-aware SFs may be apprised that SFC-related information that is conveyed using proprietary mechanisms (for example, SFC-related information) may be transported using some unused fields or extensions in Internet Protocol (IP) or Transmission Control Protocol (TCP) headers. In any other case, an SF of the plurality of SFs 120 may retain the SFC-header in the packet when sending it back to an SFF of the plurality of SFFs 118. In case the SFs correspond to SFC-unaware SFs (those SFC that are unaware of SFC information transmitted in accordance with RFC 7665 or using any other proprietary mechanism), an SF-Proxy may be present in the path between an SFF and the SF, which is responsible for removing SFC-header before sending the packet (from the SFF) to the SF, along with re-inserting the SFC-header again when sending the packet (from the SF) to the SFF. In an implementation, the plurality of SFs 120 may have a split-control-plane and user-plane architecture, using Software Defined Network (SDN) principles, or an integrated control and user plane architecture.

In operation, the SFC-O 112 may receive a request for provisioning a service function chain (SFC) of a plurality of service functions (SFs). The request may include at least a flexible SFC template (FST). In an embodiment, the FST includes, but is not limited to, an SF sequence, details of mandatory and optional SFs, conditions associated with the inclusion or exclusion of optional SFs, a matching criteria for SFC, service key performance indicators (KPIs) for selection of SFs for the SFP associated with the SFC.

In an embodiment, the SFC-O 112 may determine an SFP responsive to a receipt of data packets that correspond to a pre-defined flow of data packets to be transmitted over the network. The SFP may be determined based on, but is not limited to, the FST, a current network context, one or more network estimation inputs, and historical network data. The SFC-O 112 may monitor a pre-defined plurality of parameters associated with the SFP and a network context after implementing the SFP.

In an embodiment, the pre-defined plurality of parameters include, but are not limited to, a Quality of Service (QoS) parameter, a latency associated with an SFP, a congestion associated with an SFP, a location of a user to whom the data packets are to be transmitted, a type of an access network used for transmission, session characteristics.

In an embodiment, the monitoring may correspond to a periodic monitoring or an aperiodic monitoring. In an embodiment, the periodic monitoring may include determining the pre-defined plurality of parameters periodically based on a configurable time interval, whereas the aperiodic monitoring may include determining the pre-defined plurality of parameters when a trigger is received from one or more network entities communicatively coupled with the SFC-O 112.

The SFC-O 112 may identify a requirement for modification of the SFP based on the SFC-O 112 of the pre-defined plurality of parameters and SFP modification criteria. In an embodiment, the SFP modification criteria includes determining whether a condition for inclusion or exclusion of an SF of the SFP is satisfied, based on one or more service performance thresholds (SPT) and one or more conditions in the provisioning policy (PP) and the current network context. The SFP modification criteria may further include determining whether a change in the pre-defined plurality of parameters based on the monitoring is greater than a pre-defined threshold for parameter change. The SFP modification criteria may further include determining whether the value of at least one of the pre-defined plurality of parameters is greater than its corresponding pre-defined parameter threshold. In an embodiment, the identification may include, but is not limited to, determining whether the SF should be included in the SFP, whether the SF should be excluded from the SFP, and whether the SFP should remain un-modified. A person of ordinary skill in the art will appreciate that based on the identification, zero, one, or a plurality of instances of an SF may be included or excluded from the SFP.

The SFC-O 112 may modify the SFP responsive to the identification. In an embodiment, the modification of the SFP may include, but is not limited to, buffering of data to be transmitted using the SFP to maintain a pre-defined sequence of the data packets. In an embodiment, the modification may be based on a pre-defined SFP modification window. Such a pre-defined SFP modification window may correspond to a configurable time interval for which the modification of the SFP is deferred.

The SFC-O 112 may monitor the performance of the modified SFP based on one or more of the pre-defined plurality of parameters associated with the modified SFP, the network context after modifying the SFP, and a pre-defined plurality of performance thresholds. In an embodiment, the SFC-O 112 may adapt the SFP that has been modified based on the monitoring of the already modified SFP. A person of ordinary skill in the art will appreciate that the aforementioned modification of the modified SFP is intended to convey a recursive nature of modification of an SFP based on the monitoring. In an embodiment, the SFC-O 112 may adapt the SFP modification criteria and the FST, based on the monitored performance of the modified SFP and/or performance of historically modified SFPs. The adaptation is performed based on application of machine learning algorithms on the monitored performance. A person of ordinary skill in the art will further appreciate the aforementioned adaptation is performed after the lifetime of the SFP expires, and not immediately after the confirmation regarding effective modification of the SFP.

It should be noted that the various modules described above may be implemented in programmable hardware devices such as programmable gate arrays, programmable array logic, programmable logic devices, and so forth. Alternatively, the various modules described above may be implemented in software for execution by various types of processors. An identified module of executable code may, for instance, include one or more physical or logical blocks of computer instructions which may, for instance, be organized as an object, procedure, function, engine, or other construct. Nevertheless, the executables of an identified module need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for transmitting data over a communication network. For example, the environment 100 may transmit data over a communication network by the processes discussed herein. In particular, as will be appreciated by those of ordinary skill in the art, control logic and/or automated routines for performing the techniques and steps described herein may be implemented by the environment 100, either by hardware, software, or combinations of hardware and software. For example, suitable code may be accessed and executed by the one or more processors on the environment 100 to perform some or all of the techniques described herein. Similarly, application specific integrated circuits (ASICs) configured to perform some or all of the processes described herein may be included in the one or more processors on the environment 100.

Figure 2:
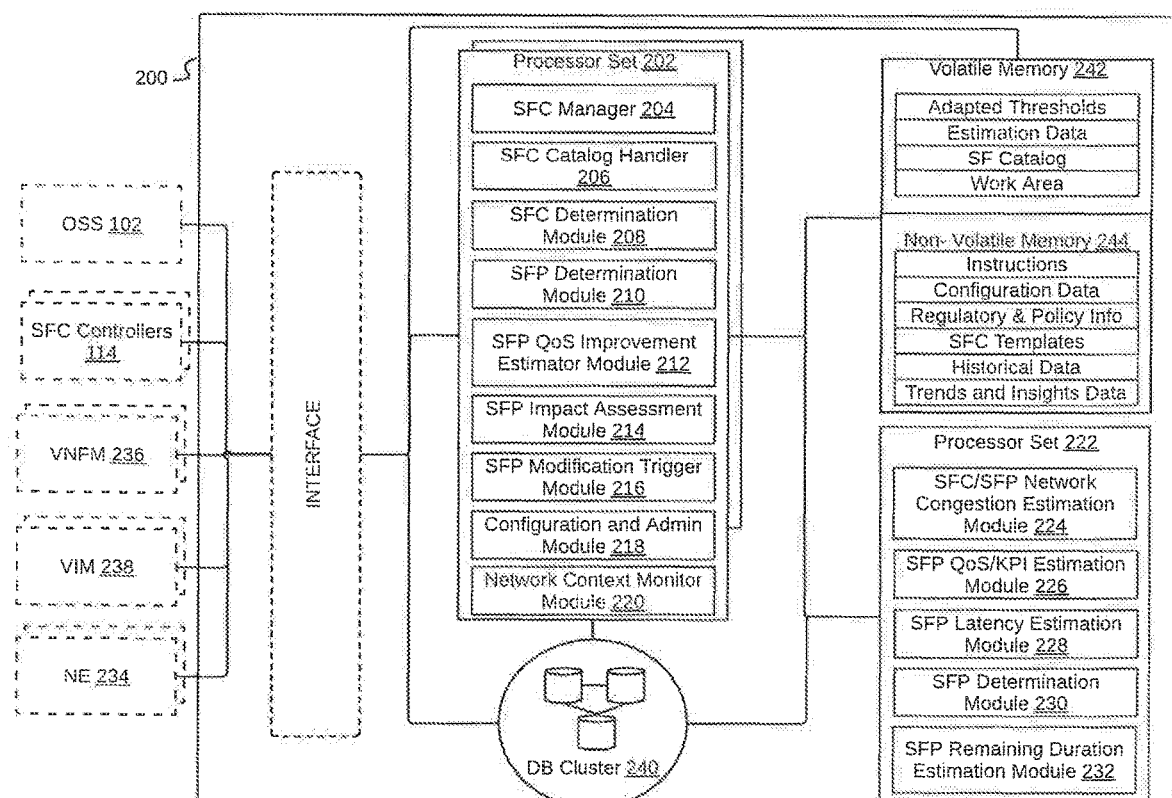
FIG. 2 illustrates a block diagram depicting various components and modules within a network device for optimizing Service Function Paths (SFPs) associated with common service functions, in accordance with an embodiment.

Referring now to FIG. 2, a block diagram depicting various components and modules within an SFC-O 200 for optimizing Service Function Paths (SFPs) associated with common service functions, in accordance with an embodiment. The SFC-O 200 may be implemented in or as a network device (not shown in FIG. 2). The network device, for example, may include, but is not limited to a server, an application server, or a gateway. The SFC-O 200 may include additional functionalities when compared with the SFC-O 112. This is further explained in detail by way of the discussion below.

The SFC-O 200 includes a processor set 202 which may include one or more processers. The processor set 202 may be made up of specially-made hardware for speedy operation. Alternatively, the processor set 202 may be built from COTS hardware with acceleration techniques for various modules within the processor set 202. The modules within the processor set 202 may include an SFC manager 204, an SFC catalog handler 206, an SFC determination module 208, an SFP determination module 210, an SFP QoS improvement Estimator module 212, an SFP impact assessment module 214, an SFP modification trigger module 216, a configuration and admin module 218, and a network context monitor module 220.

The SFC-O 200 further includes a processor set 222 that may include specialized processors for processing a large volume of real-time data and producing the results in near-real-time. The processor set 222 includes an SFC/SFP network congestion estimation module 224, an SFP QoS/KPI estimation module 226, an SFP latency estimation module 228, an SFP determination module 230, and an SFP remaining duration estimation module 232.

The SFC manager 204 is responsible for translating SFC requirement received from the OSS 102 or users into a sequence of service functions between source and destination endpoints. The SFC manager 204 further interprets the SFC template and passes the relevant instructions to the SFC determination module 208.

The SF catalog handler 206 includes information about the pool of SF instances that are available in the network domain along with their status (for example, available or unavailable). This input may then be provided to the SFP determination module 208 during determination of the SFP. The input may also be provided to the SF classifier 116 (via one of the SFC Controllers 114), which performs the SF instance determination for a particular SFP.

The SFC determination module 208 performs multiple functions. The SFC determination module 208 translates the information about the sequence of service function constructs (received from the OSS 102) into southbound SFF programming commands covering the SF classifier 116 on how to classify a flow and encapsulate the flow packet with an appropriate SFC header. The SFC determination module 208 is responsible for setting up service function steering/chaining paths for a given north bound request received from the SFC-O 200. The SFC determination module 208 takes policy rules and determines optimal SF chaining to improve overall resource utilization and user experience. The SFC determination module 208 interprets the SFC inputs received from the SFC manager 204 including information about mandatory and optional SFs in the SFC along with associated conditions. It further forms the FST based on received inputs and historical data (past learning), and provides relevant inputs to the SFP determination module 210, when triggering the SFP determination. The SFC determination module 208 further adapts FST after learning and stores details of learning to proactively adapt when a new SFC is provisioned.

The SFP determination module 210 also performs multiple functions. Upon receiving a trigger from the SFC determination module 208, the SFP determination module 210 finds out the best SF instance(s) out of the available SF instances and translates the sequence of service function constructs into southbound SFF programming commands. The best SF instance(s) are determined based on SFC KPIs (for example, latency, packet drops, etc.), policy rules, current resource occupancy and performance levels of the SFs. The SFP determination module 210 determines the sequence of SF forwarders associated with the identified sequence of SF instances to enforce the flow going through the sequence of identified SF Instances.

The SFP determination module 210 also determines the mandatory and optional SFs that are required to be part of the SFP based on network context, estimated SFC/SFP-related network conditions, estimated SFP QoS/KPI and estimate SFP latency. The SFP determination module 210 also provides appropriate instructions to one of the SFC controllers 114 to ensure in-sequence delivery of packets during and after the modification of an SFP. The SFP determination module 210 avoids making too frequent changes to an SFP by starting a timer every time a modification is done to the SFP, and deferring any further modifications until the timer expires.

Additionally, the SFP determination module 210, upon receiving a trigger from the SFP impact assessment module 214 or the SFP modification trigger module 216 for a specific SFP, determines the possible re-configuration(s) to be done to the SFP (including alternatives) and provides feedback to the SFP impact assessment module 214. The modifications to the SFP takes into consideration the following inputs: estimation data received from the SFC/SFP network congestion estimation module 224, the SFP QoS/KPI estimation module 226, the SFP latency estimation module 228; data received from the network context monitor module 220 about changes in network context (for example, change of access network); historical data of modifications done under similar conditions and effectiveness of change.

The possible re-configurations to the SFP include insertion/removal of an optional SF in the SFP, scaling up/down instances of one or more SFs, selecting an alternative instance of an SF, etc. The SFP determination module 210 also provides the options for SFP modification (PROP-CHANGE-ALTER) along with a ranking based on assessment of effectiveness and learning. In an embodiment, the layout of PROP-CHANGE-LIST is shown in Table 1 given below:

TABLE 1

| PROP-CHG-ALTER | PROP-CHANGES | Effectiveness (%) |
| --- | --- | --- |
| 1 | Scale SFC_1, Relocate SFC_2 | 85% |
| 2 | Relocate SFC_2, Relocate SFC_3 | 75% |
| ... | | |
| n | | |

The SFP impact assessment module 214 performs various functions. The SFP impact assessment module 214 determines the list of associated SFPs (i.e., an Associated-SFP-List) for every proposed change in a target SFP and performs impact assessment for the changes in each of the associated SFPs in the Associated-SFP-List using the information in an impact assessment table (IMPACT-ASSESSMENT-TABLE). In an exemplary embodiment, the impact assessment table is illustrated below as table 2.

TABLE 2

| Proposed Change | Condition for impact assessment | Impact to be assessed | Condition for action | Possible action(s) | Nature of action |
| --- | --- | --- | --- | --- | --- |
| Removal of an SF | SF instance being removed from TARGET-SFP is also part of ASSOC-SFP | Performance improvement (latency, congestion level) Resource optimization (for example, scaling down the SF) without adversely impacting the performance | Performance improvement is > PERF-IMPR-THRESOLD Resource optimization feasibility | Possibility of relocation of other SFs to balance load/optimize resources/improve performance of other SFPs. Resource optimization | Optional |
| | SF instance being removed from TARGET-SFP is not part of ASSOC-SFP | Performance/resource optimization if the SF instance can be mapped to the ASSOC-SFP | Performance improvement is > PERF-IMPR-THRESHOLD | Map the SF instance to the ASSOC-SFP | Optional |
| | SF being removed is not part of ASSOC-SFP | No action | | | |
| Insertion of SF | SF instance being inserted in TARGET-SFP is also part of ASSOC-SFP | Performance deterioration (latency, congestion level). In case of performance deterioration, possibility of relocation of other SFs to balance load/optimize resources/improve performance of other SFPs. | Performance deterioration > PERF-DETERIOR-THRESHOLD | Relocation of other SFs to improve performance Scaling up of the SF being inserted (whichever option is feasible AND has minimum impact to traffic) | Mandatory |
| | SF instance being inserted in TARGET-SFP is not part of ASSOC-SFP | No action | | | |
| Re-location of an SF (assigning a different SF instance) | The SF instance being assigned in TARGET-SFP is also part of ASSOC-SFP | Performance deterioration (latency, congestion level). In case of performance deterioration, possibility of relocation of other SFs to balance load/optimize resources/improve performance of other SFPs, else options for scaling the SF instance. | Performance deterioration > PERF-DETERIOR-THRESHOLD | Relocation of other SFs to improve performance Scaling up of the SF being assigned, i.e., scale up the SF, and assign it to the TARGET-SFP (if feasible) or to ASSOC-SFP (whichever option is feasible AND has minimum impact to traffic and minimum resource consumption, in that order) | Mandatory |
| | The SF instance being replaced (by another instance) in TARGET-SFP is also part of ASSOC-SFP | Performance improvement (latency, congestion level). In case of performance improvement, possibility of relocation of other SFs to balance load/optimize resources/improve performance of other SFPs. | Performance improvement > PERF-IMPR-THRESHOLD | Possibility of relocation of other SFs to balance load/optimize resources/improve performance of other SFPs. Resource optimization | Optional |

The SFP impact assessment module 214 further stores the list of identified impacts and associated possible actions in an impact action table (IMPACT-ACTION-TABLE) for each associated SFP. In an exemplary embodiment, the impact action table is illustrated below as table 3.

TABLE 3

| SFP-id/reference | Impact | Possible Actions |
| --- | --- | --- |
| <sfp_n> | PERF-DETER (latency increase) | Scale up SF (SF_id2) |
| ... | | |
| <sfp_m> | PERF-IMPR (throughput increase) | Re-map SF_k, SF_p (to optimize resource while sustaining performance) |
| ... | | |

The SFP impact assessment module 214 uses a counter impact table to optimize the actions to be taken on the associated SFPs. The SFP impact assessment module 214 also updates the counter impact table (COUNTER-IMPACT-TABLE) based on learning after the lifetime of an SFP. In an exemplary embodiment, the counter impact table is illustrated below as table 4.

TABLE 4

| Impact | Counter-impact (opposite effect) |
| --- | --- |
| PERF-DETER (latency increase) | PERF-IMPR (latency decrease) Congestion level decrease |
| Congestion-level increase | Congestion level decrease |

The SFP impact assessment module 214 optimizes the actions to be taken on the associated SFPs and prepares an optimal action table (OPTIMAL-ACTION-TABLE). In an exemplary embodiment, the optimal action table is illustrated below as table 5.

TABLE 5

| PROP-CHG-ALTER | OPTIMAL-ACTION-LIST |
| --- | --- |
| 1 | Action 1, Action 2 |
| 2 | Action 1, Action 3, Action 4 |

The SFP impact assessment module 214 checks if the optimal action list contains a sequence of actions which are the opposite of what was carried out within the last 'n' minutes and monitors if the changes done to the SFP are effective or not, and if not effective, the SFP impact assessment module 214 triggers necessary corrective actions.

The SFP modification trigger module 216 triggers the SFP QoS improvement estimator module 212 based on the information received from the network context monitor module 220 and/or a Network Analytics Engine (NAE), when certain SFP thresholds are crossed/about to be crossed, and/or certain SFP adjustment event triggers are fulfilled or are about to be fulfilled. The SFP adjustment event triggers could include simple events such as change in RAT type, change in mobility state (from stationary to moving or vice versa), change in roaming status, or a conditional expression involving more than one event triggers, for example, change in RAT type AND change in mobility state. The SFP modification trigger module 216 formulates appropriate SFP adjustment criteria based on the SFP thresholds and the SFP adjustment event triggers.

The SFP modification trigger module 216 runs the SFP watch timer to prevent triggering the SFP determination module 210 for SFP modification for the same reason a second time when the SFP watch timer is running, to avoid frequent toggling of the SFP. The SFP modification trigger module 216 also triggers the SFP QoS improvement estimator module 212 to monitor the SFP performance for a pre-defined duration (i.e., SFP_CHANGE_MONITOR_DURATION) after the SFP had been adapted, and provides details of the modified SFP to the SFP QoS improvement estimator module 212. The SFP performance could include parameters such as QoS, latency, Bit error rate (BER), or throughput. The SFP modification trigger module 216 also provides the thresholds for monitoring and reporting (SFP_PERF_THR). The SFP modification trigger module 216 then adapts thresholds and rules such as the SFP thresholds, SFP adjustment event triggers, the SFP adjustment criteria based on the learning during the lifetime of the SFP.

The SFP QoS improvement estimator module 212 is a module that performs various steps based on the change in network context and historical data, and as well based on the inputs from the various estimation modules within the SFC-O 200. The SFP QoS improvement estimator module 212 estimates whether there is any opportunity for improvement in QoS/KPI requirements of the SFP. Upon ascertaining that there is an opportunity for improvement, the SFP QoS improvement estimator module 212 triggers the SFP determination module 210 to adapt the SFP. The SFP QoS improvement estimator module 212 determines whether any unwanted SFs are present (from optional list of SFs), i.e., when the QoS/KPI is sufficiently above threshold and/or sufficient resources (for example, bandwidth) are available, determine whether there are any redundant SFs and/or SFs which induce more overhead than benefits. Upon ascertaining that there is an opportunity for removal of certain SFs, the SFP QoS improvement estimator module 212 triggers the SFP determination module 210 to adapt the SFP.

The SFP QoS improvement estimator module 212 continues to monitor the SFC performance for a pre-defined duration after the optimization of the SFP has been done to assess whether the optimization has been effective. Also, the SFP QoS improvement estimator module 212 monitors SFP performance parameters for a pre-defined duration when instructed by the SFP determination module 210 for a specific SFP, and compares them against pre-defined SFP thresholds. The SFP performance parameters includes pre-configured inputs such as (monitoring) change in latency, QoS, congestion and network resource usage. The pre-defined SFP thresholds may include average values over a pre-defined time window, trends/patterns, upper and/or lower threshold values, etc. For example, the pre-defined SFP thresholds may indicate a packet loss difference threshold to be 10% at least 80% of the time over a time window of 15 minutes. The pre-defined SFP thresholds violation may occur due to degradation of the SFP performance (especially post removal of one or more optional SFs), or also due to no significant improvement in the SFP performance (in case of inclusion of a new optional SF in the SFP).

The SFP QoS improvement estimator module 212 updates historical data and duration to observe the change in SFP parameters (KPIs) and impact on network after an SFP is modified and obtains the rules to determine the reason for threshold violation as part of provisioning data. These rules help in determining the reason(s) why a threshold has been violated. The SFP QoS improvement estimator module 212 adapts the reason for violation rules and forms ADAPT_REASON_THR_VIOL_RULES based on observations during the SFP operation.

The network context monitor module 220 monitors changes in network context for a user or service. This includes radio bearer QoS changes, user location, user mobility, and change in RAT type. Change in context may be fed to network context monitor module 220 from the OSS 102. In some cases, the inputs on change in context shall come directly from Network Elements (NE) 234 or from one of the SFC controllers 114 through telemetry.

In the configuration and admin module 218, the SFC Operation Administration and Maintenance (OAM) functions refer to the functionality of collecting relevant FM and PM data from the SFC path, status, detecting failures, and establishing SFC restoration paths. This function is performed with the help of inputs from the SFC controllers 114, one or more Virtual Network Function Managers (VNFM) 236, and one or more Virtualized Infrastructure Managers (VIM) 238.

In the processor set 222, the SFP remaining duration estimation module 232 estimates remaining duration of the SFP based on information such as the entity or entities involved in the session, type of the session, other context inputs such as location, time of day, access network used, etc. The SFP remaining duration estimation module 232 may perform the estimation using predictive analytics techniques and/or machine learning techniques.

The SFP remaining duration estimation module 232 further tunes the SFP duration tuning factor (SSDTF). The initial provisioned value of this factor is 1. At the end of each SFP, the SFP remaining duration estimation module 232 tunes its value based on weighted average of the difference between the actual SFP duration and the estimated SFP duration for the last 'r' SFPs including the SFP that ended just now, with different weights assigned to most recent SFPs, similar SFP types (voice, or video), SFPs involving the same users, for example.

The SFC/SFP network congestion estimation module 224 estimates SFC/SFP congestion based on traffic flowing through the SFs and the SFC/SFPs that catered to by the SFs. The SFC/SFP network congestion estimation module 224 obtains information on traffic flowing through the SFs as performance statistics data (and overload/congestion alarms, if any) from the OSS 102, and/or from one or more Network Elements (NE) 234 directly. The SFC/SFP network congestion estimation module 224 obtains information of the SFCs and SFPs from the SFC Manager 204, and the real-time network data such as performance, from a DataBase (DB) cluster 240. The SFC/SFP network congestion estimation module 224 does the estimation using predictive analytics techniques.

The SFP QoS/KPI estimation module 226 estimates QoS for the SFP taking into account the inputs received from a network data source interface module (not shown in FIG. 2) on the network conditions and SFs' KPIs, such as, latency, packet loss, etc, SFP QoS requirements, and historical data of QoS trends. The SFP QoS/KPI estimation module 226 also estimates throughput, good-put, packet drops, bit/packet errors, jitter, etc. for the next 'n' intervals of time (where 'n' is configurable, and 'interval of time' is also configurable, and could typically be 5-10 minutes). The SFP QoS/KPI estimation module 226 does the estimation using predictive analytics techniques. The SFP QoS/KPI estimation module 226 obtains information of the SFCs and SFPs from the SFC manager 204 and the real-time network data such as performance from the DB cluster 240.

The SFP latency estimation module 228 estimates the end-to-end latency of the SFP based on the network conditions and load and delays incurred on the SFs in the SFP. The SFP latency estimation module 228 makes use of metrics collected from the SFs via the network data source interface module, and analyzes trends of latency to determine threshold crossing, operating range of latency and any abnormal variations (for example, too much toggling/uncertainty, which would lead to jitter). The SFP latency estimation module 228 obtains information of the SFCs and SFPs from the SFC Manager 204 and the real-time network data, such as, performance from the DB cluster 240.

The DB cluster 240 includes a data lake or a means to store large volume of network data in real-time in a fail-safe manner, and provide the necessary data with low latency in order to enable the estimation modules described above to provide results in a timely manner. The DB cluster 240 may be used for storing the data, and well-known mechanisms may be employed for fast access.

The SFC-O 200 further includes a volatile memory 242 that includes adapted thresholds. This portion of the memory contains adapted thresholds that are used during the SFP determination, or monitoring improvements after an SFP modification. The volatile memory also includes estimation data which contains the most recent estimation data provided by the SFC/SFP network congestion estimation module 224, the SFP QoS/KPI estimation module 226, and the SFP latency estimation module 228. The volatile memory 242 includes SF catalog that contains the details of active SF instances, their location, etc. The volatile memory 242 includes work area, which is used for all temporary and operational data storage related to SFC/SFP orchestration and life cycle management.

The SFC-O 200 further includes a non-volatile memory 244 that includes instructions set for all the modules in the SFC. The non-volatile memory 224 includes configuration data, which contains the provisioned/configured data, including thresholds, rules, etc. The non-volatile memory 244 includes regulatory and policy Info that includes regulatory and policy information related to SFC/SFP handling, including anti-affinity policy, or SF placement policy. The non-volatile memory 224 includes SFC templates which are originally provisioned but which may have been modified by the SFC-O subsequently based on self-learning. The non-volatile memory 224 includes historical data, which contains historical data regarding changes done to SFPs, effectiveness of the changes. The non-volatile memory includes trend and insights data, which contains the trends of network conditions, QoS of active SFPs, as provided by the SFC/SFP network congestion estimation module 224, SFP QoS/KPI estimation module 226, and SFP latency estimation nodule 228.

Figure 3:
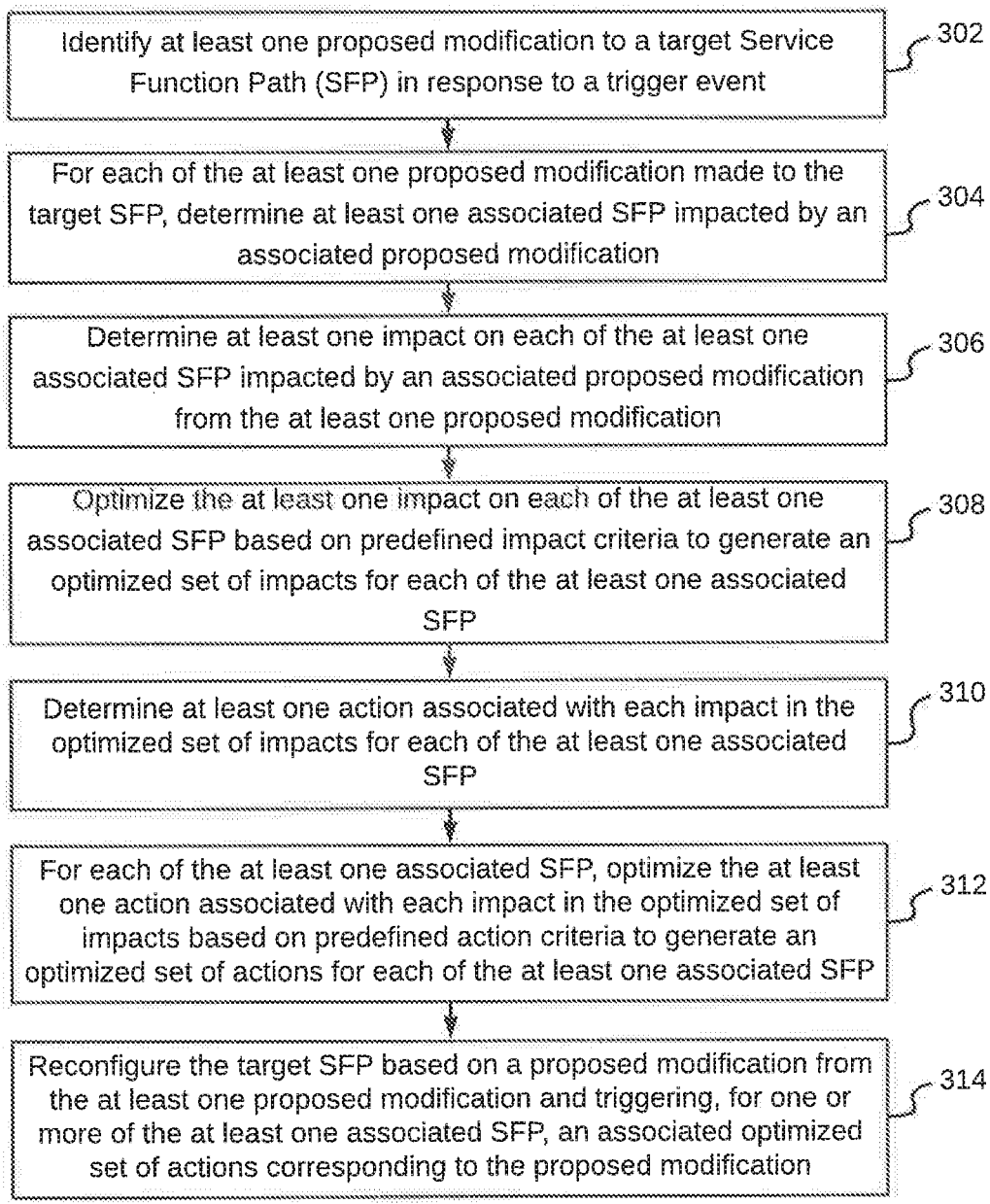
FIG. 3 illustrates a flowchart of a method for optimizing SFPs associated with common service functions, in accordance with an embodiment.

Referring now to FIG. 3, a flowchart of a method for optimizing SFPs associated with common service is illustrated, in accordance with an embodiment. At step 302, a network device identifies one or more proposed modification to a target SFP to resolve a trigger event. In an embodiment, the SFP determination module 210 receives a trigger to modify the target SFP. The trigger may either be received from the SFP QoS improvement estimator module 212 or from the SFP impact assessment module 214. In either case, the SFP determination module 210 determines one or more possible modification that may be made to the target SFP (including alternatives) (for example, PROP-CHANGE-LIST depicted in table 1) so that the target SFP KPI requirements are fulfilled.

The trigger event may include modification in an SFP associated with the target SFP, such that, one or more service functions are common between the two. The SFP determination module 210 determines the one or more proposed modifications to be done in the SFP based on module that generated the trigger event or in other words triggered modification of the target SFP. The trigger for modification of the target SFP may be received from the SFP QoS improvement estimator module 212. In this case, the SFP determination module 210 determines the SFs to be inserted/removed. In addition, the SFP determination module 210 also determines possible alternatives, for example, an alternative to insertion of an SF could be to scale other SFs, or re-locate other SFs. By way of an example, consider insertion of a video optimizer due to limited bandwidth along the SFP. An alternative could be to scale the network resources for the SFP or to relocate the SF instances to another location, if feasible.

In an embodiment, the trigger for modification of the target SFP may be received due to a change in the network context, user context, or session context. In this case, the SFP determination module 210 determines the changes to be done, such as, scaling up/down one or more SFs, or re-locating one or more SFs. In addition, the SFP determination module 210 also determines possible alternatives, for example, an alternative to re-locating an SF could be to re-locate some other SFs.

In another embodiment, the trigger for modifying the target SFP may be received from the SFP impact assessment module 214. In this case, the SFP determination module 210 takes into consideration the recommended changes, and checks the feasibility of those changes, taking into consideration the inputs from the SFC/SFP network congestion estimation module 224, the SFP QoS/KPI estimation module 226, and the SFP latency estimation module 228, and estimated remaining duration of the target SFP. The SFP determination module 210 also determines possible alternatives to the recommended changes.

Finally, the SFP determination module 210 prepares the PROP-CHANGE-LIST containing changes and alternatives (PROP-CHG-ALTER) along with the effectiveness. The effectiveness value is fetched from historical data based on the effectiveness of the change which is measured by the number of corrective actions that had to be taken after making the change. For example, a simple method of averaging the number of corrective actions taken within a time window in the past could be taken and expressed as a ratio of the number of changes done initially. Alternatively, number of corrective actions weighted by the number of associated SFPs impacted, number of thresholds crossed, and expressed as a weighted ratio of the number of changes done initially may be used.

At step 304, for each of the one or more proposed modification made to the target SFP, the network device determines one or more associated SFPs impacted by an associated proposed modification. The one or more associated SFPs include one or more common service function with the target SFP. In an embodiment, the SFP determination module 210 triggers the SFP impact assessment module 214 to analyze the impact of the one more proposed changes to the target SFP on the one or more associated SFPs. The SFP impact assessment module 214 may request for the estimated remaining subsistence duration (ESTIM-REM-DUR) of the target SFP from the SFP remaining duration estimation module 232. This is further explained in detail in conjunction with FIG. 5.

At step 306, the network device determines one or more impacts on each of the one or more associated SFPs impacted by an associated proposed modification from the one or more proposed modifications. An impact from the one or more impacts on an associated SFP is determined based on one or more of load and congestion level on the associated SFP during a past predefined time duration and average traffic and traffic spikes coming from the target SFP. In an embodiment, the SFP impact assessment module 214 performs multiple steps for each of the one or more associated SFPs. For a given associated SFP, the SFP impact assessment module 214, for each proposed modification in the PROP-CHG-ALTER associated with the associated SFP determines the impact of each proposed modifications on the associated SFP using an IMPACT-ASSESSMENT-TABLE (for example, illustrated in Table 2). The SFP impact assessment module 214 assesses the performance impact (improvement/deterioration) based on factors such as overall load/congestion level trends for the associated SF during last 'n' minutes (where 'n' is configurable), average traffic and traffic spikes coming from the target SFP. The SFP impact assessment module 214 may communicate with SFP QoS/KPI estimation module 226, SFP latency estimation module 228, SFC/SFP network congestion estimation module 224 for this estimation. It will be apparent to a person skilled in the art that the derivative actions on a change in an associated SFP on other SFPs which may be associated with the associated SFP are also within the scope of the invention, as the associated SFP would become the target SFP.

The SFP impact assessment module 214 then stores the one or more impacts (ASSOC-SFP-IMP) and the possible actions (POSS-ACT) for each of the one or more associated SFPs in the IMPACT-ACTION-TABLE (for example, the IMPACT-ACTION-TABLE illustrated in table 3) for each of the one or more proposed modifications.

Thereafter, at step 308, at least one impact on each of the at least one associated SFP are optimized, by the network device, based on predefined impact criteria to generate an optimized set of impacts for each of the at least one associated SFP. For an associated SFP from the one or more associated SFPs, the predefined impact criteria may include identifying a set of impacts from the one or more impacts for the associated SFP, such that, the one or more impacts from the set of impacts nullifies effect of one or more remaining impacts in the set of impacts.

In an embodiment, for an associated SFP, the SFP impact assessment module 214 checks ASSOC-SFP-IMP for impacts that have opposite effect, and hence cancel out each other (for example, latency increase and latency decrease), and remove associated POSS-ACT from the IMPACT-ACTION-TABLE. This may be done by using a pre-provisioned table such as COUNTER-IMPACT-TABLE (for example, COUNTER-IMPACT-TABLE illustrated in table 4).

Thereafter, at step 310, the network device determines one or more actions associated with each impact in the optimized set of impacts for each of the one or more associated SFPs. At step 312, for each of the one or more associated SFPs, the network device optimizes the one or more action associated with each impact in the optimized set of impacts based on predefined action criteria. This generates an optimized set of actions for each of the one or more associated SFPs.

For an associated SFP from the one or more associated SFPs, the predefined action criteria may include identifying a set of actions capable of nullifying each of the plurality of impacts for the associated SFP. The predefined action criteria may include removing one or more actions from the set of actions, such that, the one or more actions reverses the effect of one or more counter actions performed within a predefined time duration. The predefined action criteria may additionally include determining the optimized set of actions for the associated SFP, such that, the optimized set of actions include remaining actions in the set of actions.

In an embodiment, for an associated SFP, the SFP impact assessment module 214 determines POSS-ACT that can be optimized, i.e., the minimum number of actions listed in POSS-ACT to be taken so that the overall impact can be nullified. The SFP impact assessment module 214 determines this based on the IMPACT-ACTION-TABLE, considering the nature of impact also, and based on learning as to which action or actions are the most effective. The SFP impact assessment module 214 then updates the OPTIMAL-ACTION-TABLE (for example, OPTIMAL-ACTION-TABLE illustrated in table 5) if it already exists, else the SFP impact assessment module 214 prepares a new OPTIMAL-ACTION-TABLE.

The SFP impact assessment module 214 then check if the OPTIMAL-ACTION-LIST contains a sequence of actions the opposite of which were carried out during the last 'n' minutes. Such a check is performed to avoid getting into an infinite loop of repetitive actions and counter-actions. To this end, the SFP impact assessment module 214 compares the sequence of actions to be taken now based on the OPTIMAL-ACTION-LIST, and the sequence of actions taken, for example, during the last 'n' minutes, or the last 'm' actions taken, and based on learning from historical data on the number of steps that leads to a repetitive sequence.

After the SFP impact assessment module 214 has scanned through each of the one or more associated SFPs, the SFP impact assessment module 214 checks for further optimization, for example, by checking if there are any impacts that have the opposite effect. To this end, the SFP impact assessment module 214 may check if the OPTIMAL-ACTION-LIST includes a sequence of actions the opposite of which were carried out during the last 'n' minutes. The SFP impact assessment module 214 compares the sequence of actions to be taken now based on the OPTIMAL-ACTION-LIST, and the sequence of actions taken, during the last 'n' minutes, or the last 'm' actions taken, and based on learning from historical data on the number of steps that leads to a repetitive sequence.

The SFP impact assessment module 214 also checks for remaining subsistence duration of the target SFP by triggering the SFP remaining duration determination module 232. This is explained in detail in conjunction with FIG. 5. In an embodiment, the SFP impact assessment module 214 may also check for remaining subsistence duration for each of the one or more associated SFPs At step 314, the network device reconfigures the target SFP based on a proposed modification from one or more proposed modifications. Additionally, at step 314, for one or more of the one or more associated SFPs, the network device triggers, an associated optimized set of actions corresponding to the proposed modification for the target SFP.

The proposed modification from the one or more proposed modifications is identified, such that, the proposed modification causes minimum number of impacts on associated SFPs and satisfies a selection criterion. The selection criterion may include one or more of: minimum mandatory changes in associated SFPs and minimum network resource consumption because of the proposed modification.

In an embodiment, the SFP impact assessment module 214 checks whether the time elapsed since the last modification done to the target SFP is greater than ALPHA_T (where ALPHA-T is a pre-configured value in seconds or minutes). In case the time elapsed since the last re-configuration done to the target SFP is greater than ALPHA_T, the SFP impact assessment module 214 check whether ESTIM-REM-DUR (a predefined SFP subsistence period of the target SFP) is more than BETA_T. In case the time elapsed since the last re-configuration done to the target SFP is less than ALPHA_T, the SFP impact assessment module 214 starts a timer whose value is equal to: (ALPHA_T—Time elapsed since last configuration was done to the target SFP).

If the ESTIM-REM-DUR of the target SFP is more than BETA_T and the number of changes in the OPTIMAL-ACTION-TABLE is less than a first threshold for number of actions (NBR_ACTION_THR_1), then the SFP impact assessment module 214 updates the indication RECONFIG-URE-SFP as true. Otherwise, if the number of actions in the OPTIMAL-ACTION-TABLE is less than a second threshold for the number of actions, then the SFP impact assessment module 214 starts a timer WATCH_SFP_TIMER, for which the value is pre-configured.

In case the ESTIM-REM-DUR of the target SFP is less than BETA_T, the SFP impact assessment module 214 checks whether the ESTIM-REM-DUR of the target SFP is greater than PHI_T. In case the ESTIM-REM-DUR of the target SFP is greater than PHI_T and in case the number of actions in the OPTIMAL-ACTION-TABLE is less than minimum threshold for number of actions (i.e., NBR_AC-TIONS_THR_MIN), the SFP impact assessment module 214 updates the indication RECONFIGURE-SFP as true.

If RECONFIGURE-SFP=true for more than one alternative in the PROP-CHG-ALTER, then the alternative with highest effectiveness (which may be taken from the PROP-CHANGE-LIST) is selected by the SFP impact assessment module 214. If there is a tie (or if the difference in effectiveness is less than a certain provisioned threshold value, for example, 5%), then the SFP impact assessment module 214 selects the alternative with minimum mandatory changes and/or the alternative that consumes minimum network resources. To this end, the SFP impact assessment module 214 may use a simple weighted average of number of mandatory changes and additional/lesser network resource consumption (compute, bandwidth). Alternatively, the SFP impact assessment module 214 may implement methods that involve taking into consideration factors, such as, complexity of the changes done (for example, number of SFPs impacted due to reconfiguration of an SF, which may include placement, scaling, or inclusion/exclusion). The SFP impact assessment module 214 may also applying a suitable weightage for minimum network resource usage, based on the availability of free network resources and estimated traffic growth within the next 'n' minutes (where 'n' is configurable).

If RECONFIGURE-SFP=true for none of the alternatives, then, if WATCH-SFP-TIMER is running, the SFP impact assessment module 214 may wait until WATCH-SFP-TIMER expires, and if there is no change in condition of the target SFP, then the SFP impact assessment module 214 selects the alternative for which the WATCH-SFP-TIMER was started. However, if the WATCH-SFP-TIMER is not running, then the SFP impact assessment module 214 informs OSS 102 of SFP impacts and waits for further direction from OSS 102. The SFP impact assessment module 214 then provides the response to the SFP determination module 210 with the outcome of the analysis performed above with the relevant details of the changes to be carried out in the target SFP.

The SFP determination module 210 then carries out the reconfiguration to the target SFP based on the inputs received above from the SFP impact assessment module 214. The SFP determination module 210 may then inform the SFP impact assessment module 214 upon completion of the reconfigurations, and may also note the time of making the re-configuration for the target SFP.

With regards to associated SFPs, the SFP impact assessment module 214 receives an update from the SFP determination module 210 upon completion of modification of the target SFP. The SFP impact assessment module 214 then initiates modification of associated SFPs by sending a trigger to SFP determination module 210. The trigger may include impact and assessment details (for example, relevant information and details of the impacts). The trigger may also include list of changes to be performed (relevant portions of the OPTIMAL-ACTION-LIST).

Figure 4A:
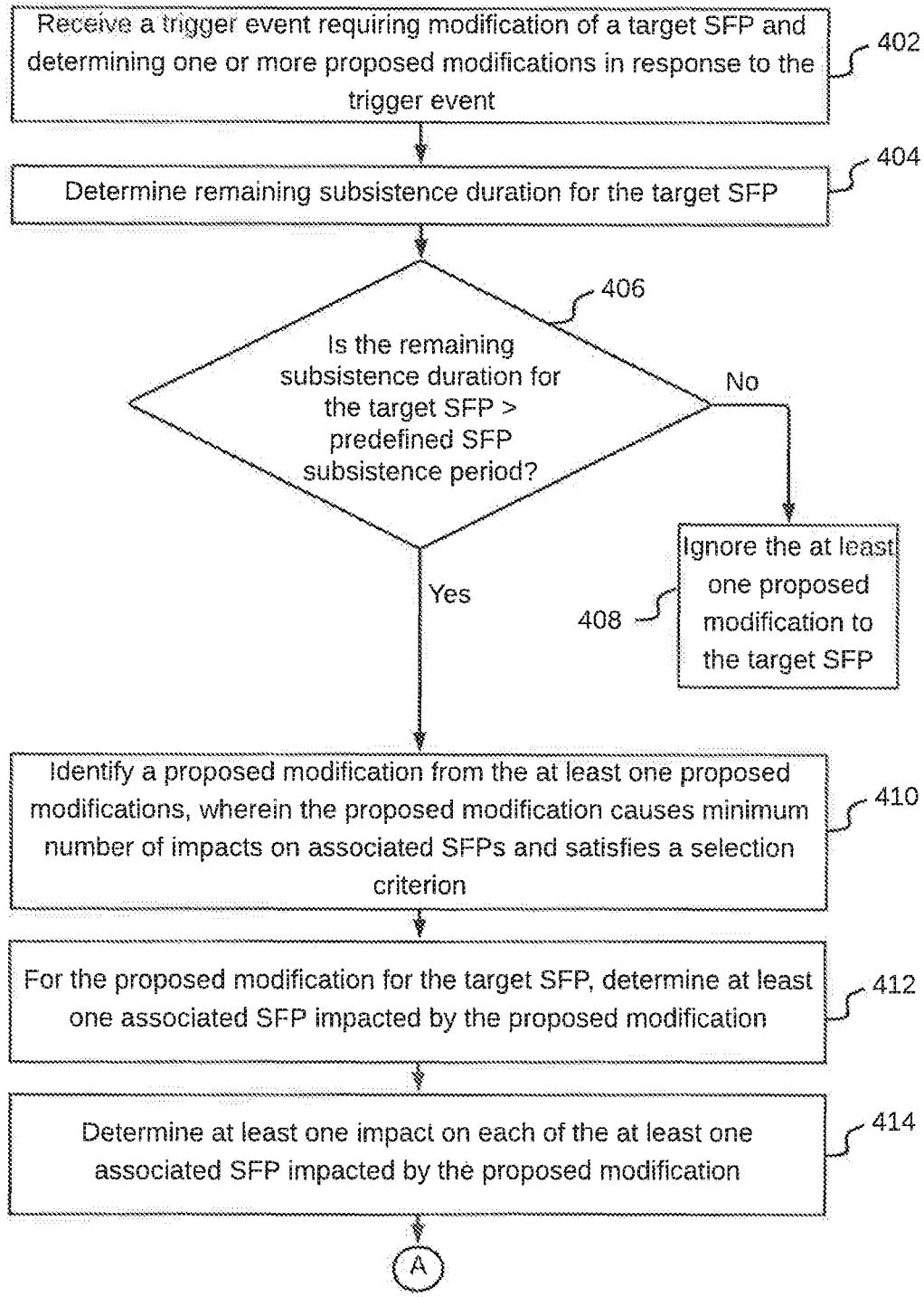
FIGS. 4A, 4B, and 4C illustrate a flowchart of a method for optimizing SFPs associated with common service functions, in accordance with another embodiment.
Figure 4B:
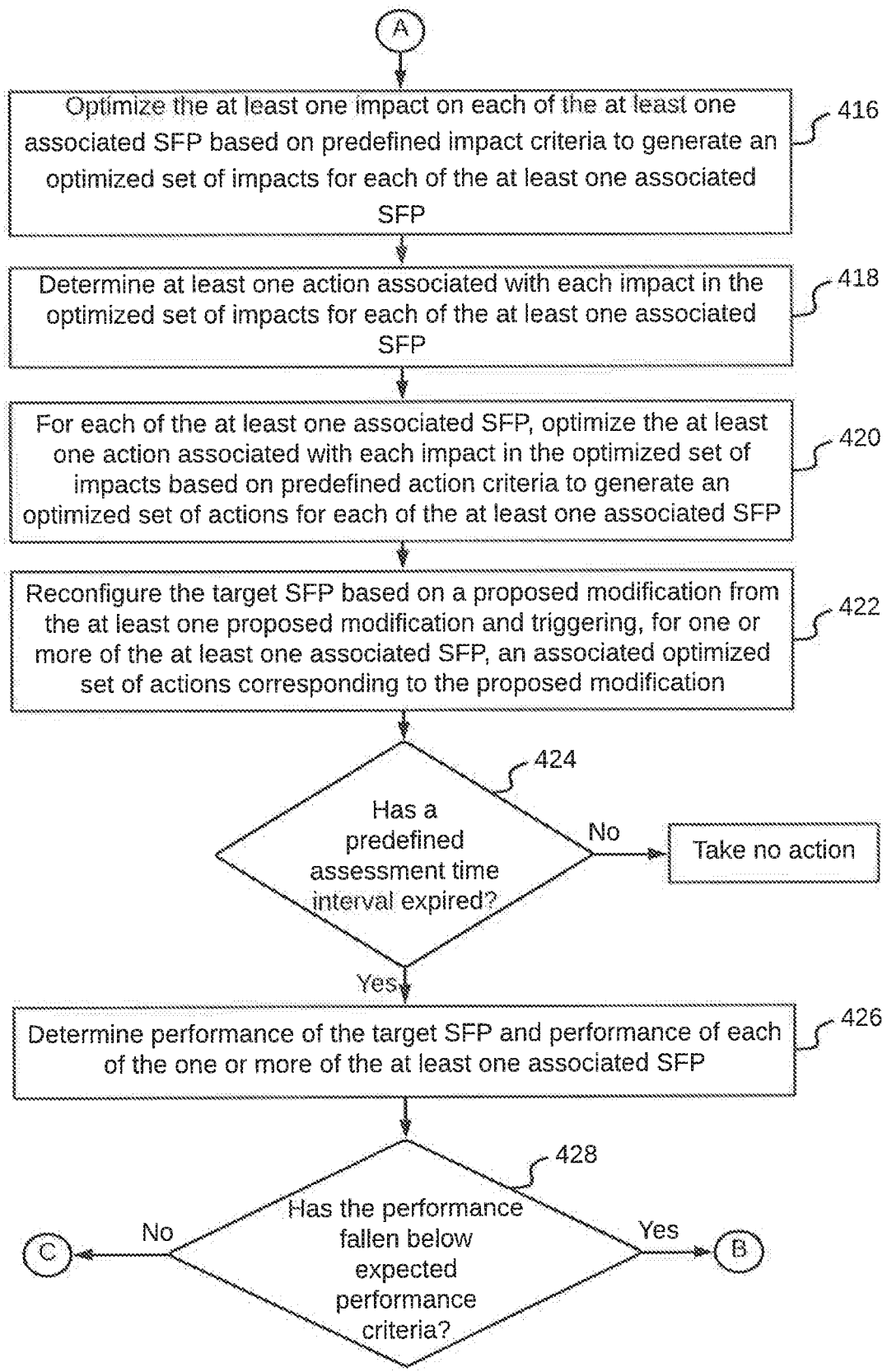
Figure 4C:
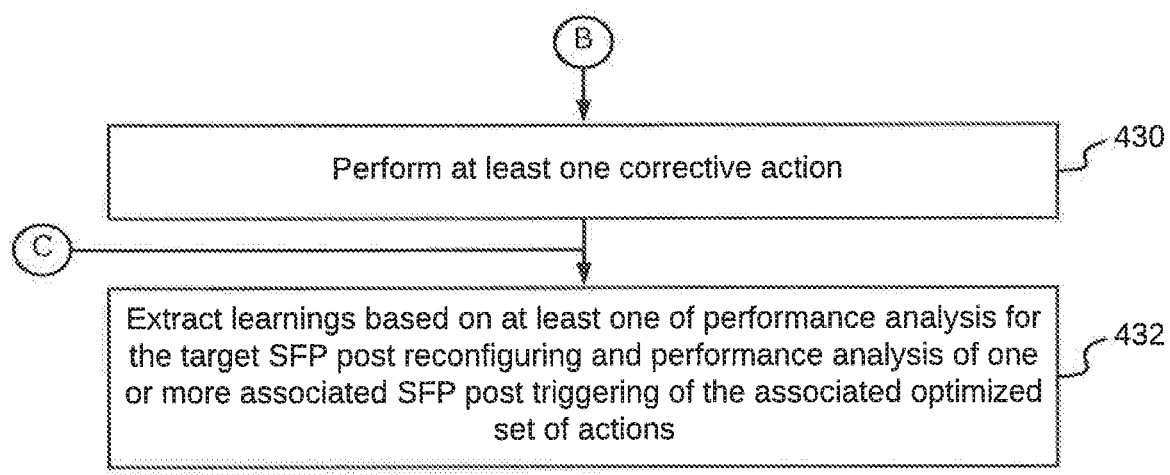

Referring now to FIGS. 4A, 4B, and 4C, a flowchart of a method for optimizing SFPs associated with common service functions is illustrated, in accordance with another embodiment. At step 402, a trigger event requiring modification of a target SFP is received and one or more proposed modification for the target SFP are determined. This is explained in detail in conjunction with FIG. 3. At step 404, remaining subsistence duration for the target SFP is determined. As step 406, a check is performed to determine if the remaining subsistence duration for the target SFP is greater than a predefined SFP subsistence period. If the remaining subsistence duration for the target SFP is less than the predefined SFP subsistence period, at step 408, the one or more proposed modification to the target SFP are ignored. This has been explained in detail in conjunction with FIG. 3.

However, if the remaining subsistence duration for the target SFP is greater than the predefined SFP subsistence period, at step 410, a proposed modification from the one or more proposed modifications is identified, such that, the proposed modification causes minimum number of impacts on associated SFPs and satisfies a selection criterion. The selection criterion may include one of minimum mandatory changes in associated SFPs and minimum network resource consumption. This has been explained in detail in conjunction with FIG. 3.

At step 412, for the proposed modification for the target SFP, one or more associated SFPs impacted by the proposed modification are determined. At step 414, one or more impacts on each of the one or more associated SFPs impacted by the proposed modification is determined. At step 416, the one or more impacts on each of the one or more associated SFP are optimized based on predefined impact criteria to generate an optimized set of impacts for each of the one or more associated SFPs. This has been explained in detail in conjunction with FIG. 3.

At step 418, one or more actions associated with each impact in the optimized set of impacts for each of the one or more associated SFPs are determined. At step 420, for each of the one or more associated SFPs, the one or more actions associated with each impact in the optimized set of impacts is optimized based on predefined action criteria to generate an optimized set of actions for each of the one or more associated SFPs. At step 422, the target SFP is reconfigured based on the proposed modification. Additionally, at step 422, for one or more of the one or more associated SFPs, an associated optimized set of actions corresponding to the proposed modification is triggered. This has been explained in detail in conjunction with FIG. 3.

At step 424, a check is performed to determine whether a predefined assessment time interval has expired or not. If the predefined assessment time interval has not expired, no further action is taken. However, if the predefined assessment time interval has expired, performance of the target SFP and performance of each of the one or more of the one or more associated SFPs is determined at step 426.

Thereafter, a check is performed at step 428 to determine if the performance has fallen below expected performance criteria. If the performance has fallen below the expected performance criteria, one or more corrective actions is performed at step 430.

In an embodiment, the SFP impact assessment module 214 monitors effectiveness of the proposed change and triggering of the optimized set of actions for a duration of CHANGE-EFFECTIVENESS-DURATION (which is pre-provisioned). To this end, in case of the proposed modification made to the target SFP, the SFP impact assessment module 214 monitors the KPIs that triggered the proposed modification, as well as other KPIs associated with the target SFP and overall performance of the target SFP. While monitoring the change, the SFP impact assessment module 214 eliminates (estimated) effect of environmental factors and changes done in other SFPs not related to the change in the target SFP. In case of changes done to an associated SFP, the SFP impact assessment module 214 monitors change in KPI/performance of the target SFP due to those changes.

If the changes caused a negative impact (for example, latency increased from earlier value), the SFP impact assessment module 214, after eliminating the effect of changes in network context, triggers restoration to the earlier state, and determines/acts upon alternative proposed changes (PROP-CHG-ALTER). However, if none exists, the SFP impact assessment module 214 may raise an alarm. If the changes did not have a positive impact (for example, no increase in throughput), the SFP impact assessment module 214, after eliminating the effect of changes in network context, restores the earlier state, if the number of changes is less than NBR-CHG-THR-1 and the current state uses more network resources than the previous state after checking for any alternatives (PROP-CHG-ALTER). If there are alternatives, PROP-CHG-ALTER triggers the SFP determination module 210 to reconfigure the target SFP accordingly. However, if no alternative exists or is not feasible, the SFP impact assessment module 214 waits in the same state. The changes described above are measured across all the impacted SFPs (i.e., the target SFP and the one or more associated SFPs) and appropriate corrective actions are taken.

Thereafter, at step 432, learnings based on one or more of performance analysis for the target SFP post reconfiguring and performance analysis of one or more associated SFPs post triggering of the associated optimized set of actions is extracted. The learnings are extracted for future optimization of service function paths associated with common service functions. Referring back to step 428, if the performance has not fallen below expected performance criteria, the step 432 is performed.

In an embodiment, upon expiry of CHANGE-EFFECTIVENESS-DURATION timer, after taking necessary corrective actions, learning associated with the thresholds and parameter values for the target SFP are extracted and later adapted based on the learning. The learnings may include effectiveness of the change, based on the number of corrective actions taken and number of SFPs impacted. The NBR-ACTION-THR-1 and the NBR-ACTION-THR-2 may be adapted, based on critical impacts to associated SFPs after making the change (for example, number of threshold crossing alarms received). At the end of the lifetime for the target SFP and other associated SFPS, i.e., when an SFP is terminated, the SFP impact assessment module 214 updates various thresholds and parameter values for future sessions. Such updates may include updating the list of possible actions for a specific impact in the IMPACT-ASSESS-MENT-TABLE along with the effectiveness of each change. Such updates may also include triggering the SFP remaining duration estimation module 232 to update the SFP duration tuning factor.

Figure 5:
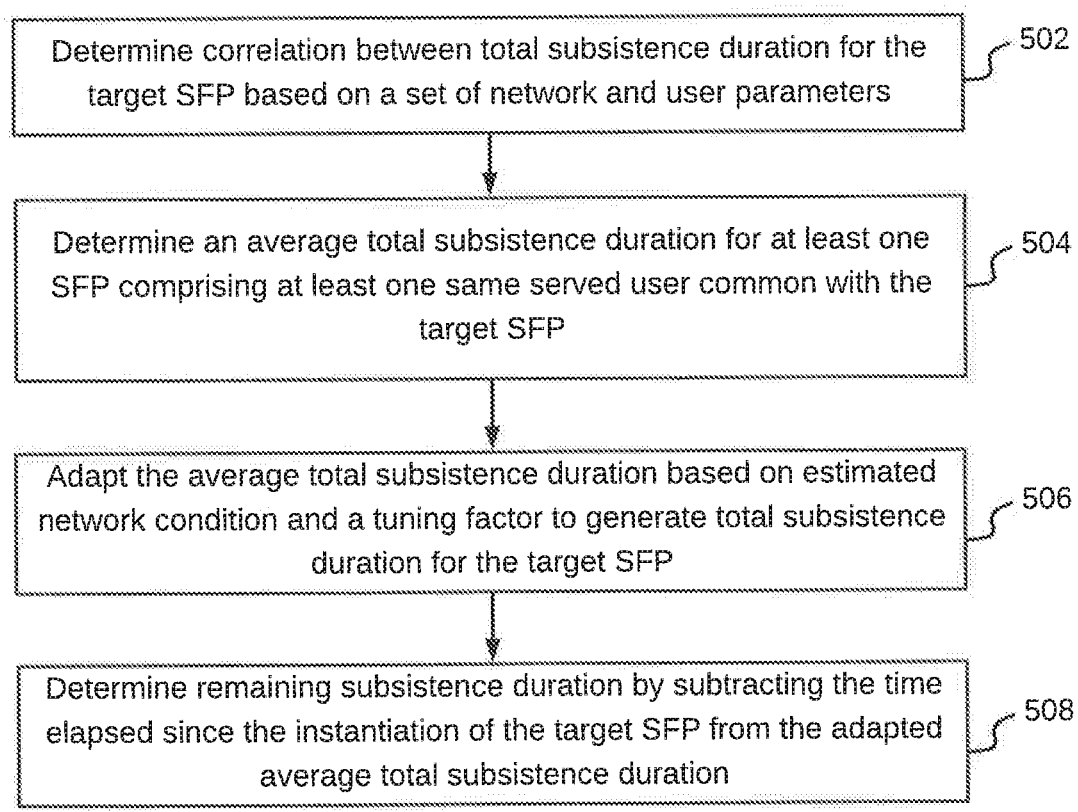
FIG. 5 illustrates a flowchart of a method for determining the remaining subsistence duration for a target SFP, in accordance with an embodiment.

Referring now to FIG. 5, a flowchart of a method for determining the remaining subsistence duration for a target SFP is illustrated, in accordance with an embodiment. At step 502, correlation between total subsistence duration for the target SFP based on a set of network and user parameters is determined. At step 504, an average total subsistence duration for one or more SFPs comprising at least one same served user common with the target SFP is determined. Thereafter, at step 506, the average total subsistence duration is adapted based on estimated network condition and a tuning factor to generate total subsistence duration for the target SFP. At step 508, the remaining subsistence duration is determined by subtracting the time elapsed since the instantiation of the target SFP from the adapted average total subsistence duration.

In an embodiment, the SFP remaining duration estimation module 232 may first estimate raw SFP duration by determining the correlation between the SFP duration and parameters, such as, time of day, location of the served user, the remote party involved in the session, mobility of the served user, or type of session. The SFP remaining duration estimation module 232 may use well-known predictive algorithms/models such as linear regression or quantile regression for the same. Based on the correlation outcome, the SFP remaining duration estimation module 232 may apply appropriate weighting factors and take the average of the last 'n' SFPs involving the served user (or same 'class of user') to determine the SFP duration for the current SFP. In an embodiment, in case of sessions where the total amount of data to be transferred is known, for example, as in case of a file download, doing a simple computation for the raw SFP duration as being equal to total amount of data to be transferred/throughput may be performed.

The SFP remaining duration estimation module 232 may then adapt the SFP duration based on estimated network conditions. The SFP duration determined above may be adapted based on the estimated network conditions, using pre-provisioned scaling factors. In an exemplary embodiment, a table 6 given below may be used:

TABLE 6

| Estimated average network resource occupancy level | Scaling Factor |
|---|---|
| <50% | 1 |
| 50-70% | 1.1 |
| 70-85% | 1.2 |
| >85% | 1.4 |

In an alternate embodiment, the SFP duration determined above may be adapted by determining correlation between network conditions and increase in SFP duration, for predetermined SFP-duration cases (for example, in case of a file download) using well-known models such as linear regression. Based on the correlation, the SFP remaining duration estimation module 232 may scale up the SFP duration appropriately. The SFP remaining duration estimation module 232 may then adjust the SFP duration (ADJ-SFP-DUR) using the tuning factor SSDTF. The remaining subsistence duration for the SFP is then computed by subtracting the time elapsed since the SFP was instantiated from ADJ-SFP-DUR.

Figure 6:
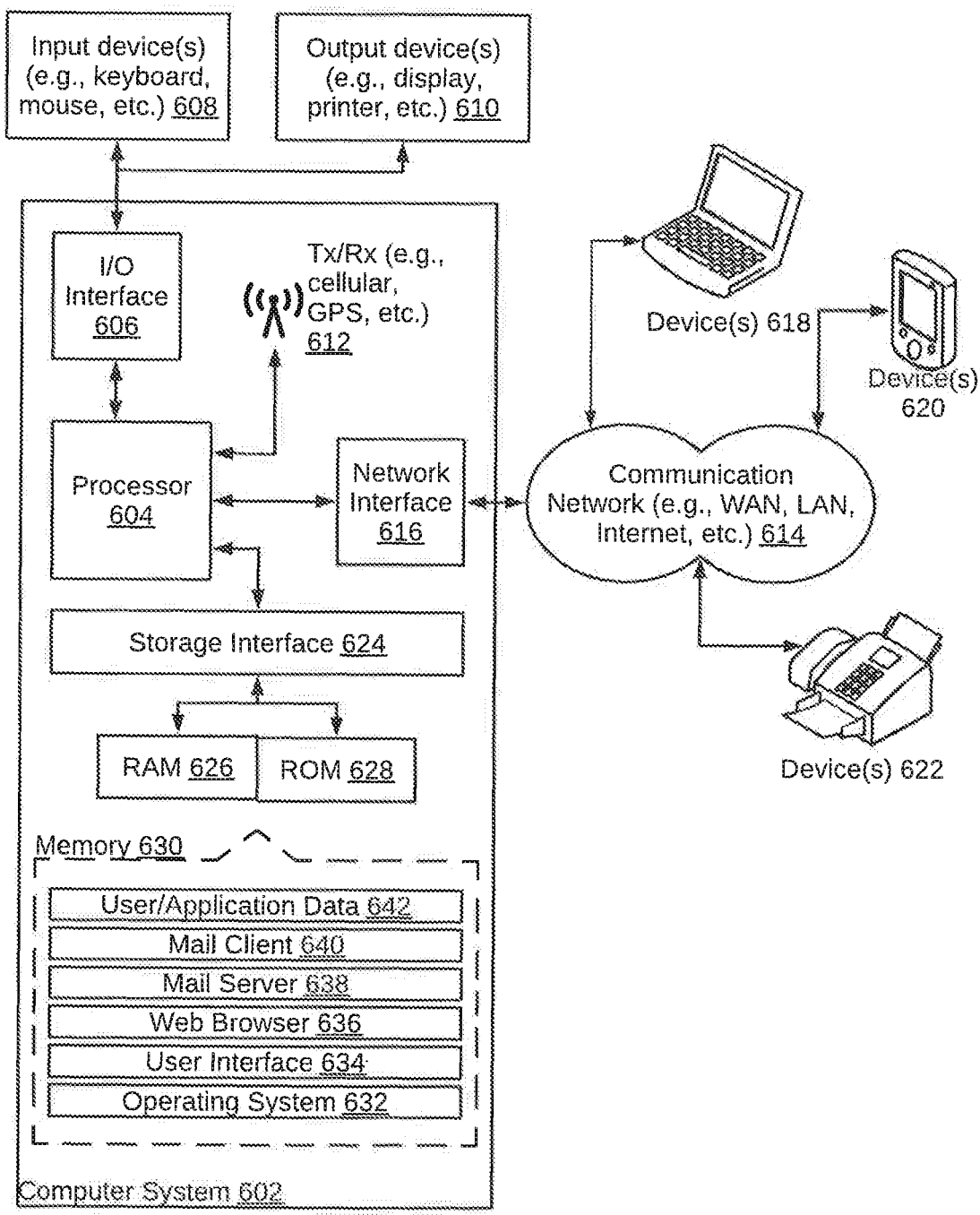
FIG. 6 illustrates a block diagram of an exemplary computer system for implementing various embodiments.

FIG. 6 is a block diagram of an exemplary computer system for implementing various embodiments. Computer system 602 may include a central processing unit ("CPU" or "processor") 604. Processor 604 may include at least one data processor for executing program components for executing user- or system-generated requests. A user may include a person, a person using a device such as such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 610 may be a printer, fax machine, video display (for example, cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (for example, TEXAS® INSTRUMENTS WILINK WL1286® transceiver, BROADCOM® BCM45501UB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (for example, twisted pair 50/500/5000 Base T), transmission control protocol/ internet protocol (TCP/IP), token ring, IEEE 802.11a/b/g/n/ x, etc. Communication network 614 may include, without limitation, a direct interconnection, local area network (LAN), wide area network (WAN), wireless network (for example, using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (for example, APPLE® IPHONE® smartphone, BLACKBERRY smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DSe gaming console, SONY PLAYSTATION® gaming console, etc.), or the like. In some embodiments, computer system 602 may itself embody one or more of these devices.

In some embodiments, processor 604 may be disposed in communication with one or more memory devices (for example, RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, user interface application 634, web browser 636, mail server 638, mail client 640, user/application data 642 (for example, any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component. Web browser 636 may be a hypertext viewing application, such as MICROSOFT INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 602 may implement a mail server 638 stored program component. Mail server 638 may be an Internet mail server such as MICROSOFT® EXCHANGE® mail server, or the like. Mail server 638 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 638 may utilize communication protocols such as internet message access protocol (IMAP), messaging application programming interface (MAPI), Microsoft Exchange, post office protocol (POP), simple mail transfer protocol (SMTP), or the like.

In some embodiments, computer system 602 may implement a mail client 640 stored program component. Mail client 640 may be a mail viewing application, such as APPLE MAIL mail client, MICROSOFT ENTOURAGE® mail client, MICROSOFT OUTLOOK® mail client, MOZILLA THUNDERBIRD® mail client, etc.

In some embodiments, computer system 602 may store user/application data 642, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide method and system for managing service function paths associated with common service functions. The method disclosed here proposes a mechanism of dynamic and context-aware service function chaining. This mechanism determines possible impact of adapting a specific SFP on the performance of that specific SFP as well as other associated SFPs, and the usage of network resources associated with those SFPs. Based on the determined impact, the method performs reconfiguration of SFP in order to improve performance of the SFP. The method also performs suitable reconfiguration to the associated SFPs after modifying the specific SFP. The method assesses the effectiveness of the modifications done and takes appropriate corrective actions. The method also assimilates the learnings from the actions and their effectiveness for improved future actions, both during the lifetime of the specific SFP, as well as during future SFP creation and maintenance.

The specification has described method and system for managing service function paths associated with common service functions. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of optimizing service function paths associated with common service functions, the method comprising:

identifying, by a network device, at least one proposed modification to a target Service Function Path (SFP) to in response to a trigger event;

for each of the at least one proposed modification made to the target SFP, determining, by the network device, at least one associated SFP impacted by an associated proposed modification, wherein the at least one associated SFP comprises at least one common service function with the target SFP;

determining, by the network device, at least one impact on each of the at least one associated SFP impacted by an associated proposed modification from the at least one proposed modification;

optimizing, by the network device, the at least one impact on each of the at least one associated SFP based on predefined impact criteria to generate an optimized set of impacts for each of the at least one associated SFP, wherein, for an associated SFP from the at least one associated SFP, the predefined impact criteria comprises identifying a set of impacts from the at least one impact for the associated SFP, wherein one or more impacts from the set of impacts nullifies effect of one or more remaining impacts in the set of impacts;

determining, by the network device, at least one action associated with each impact in the optimized set of impacts for each of the at least one associated SFP;

for each of the at least one associated SFP, optimizing, by the network device, the at least one action associated with each impact in the optimized set of impacts based on predefined action criteria to generate an optimized set of actions for each of the at least one associated SFP; and reconfiguring, by the network device, the target SFP based on a proposed modification from the at least one proposed modification and triggering, for one or more of the at least one associated SFP, an associated optimized set of actions corresponding to the proposed modification.

2. The method of claim 1, further comprising receiving the trigger event requiring modification of the target SFP, wherein the trigger event comprises modification in an associated SFP comprising at least one common service function with the target SFP.

3. The method of claim 1, further comprising identifying the proposed modification from the at least one proposed modification, wherein the proposed modification causes minimum number of impacts on associated SFPs and satisfies a selection criterion, wherein the selection criterion comprises at least one of minimum mandatory changes in associated SFPs and minimum network resource consumption.

4. The method of claim 1, further comprising determining remaining subsistence duration for the target SFP.

5. The method of claim 4, wherein determining the remaining subsistence duration for the target SFP comprises:

determining correlation between total subsistence duration for the target SFP based on a set of network and user parameters;

determining an average total subsistence duration for at least one SFP comprising at least one same served user common with the target SFP;

adapting the average total subsistence duration based on estimated network condition and a tuning factor to generate total subsistence duration for the target SFP; and determining the remaining subsistence duration by subtracting the time elapsed since the instantiation of the target SFP from the adapted average total subsistence duration.

6. The method of claim 4, further comprising ignoring the at least one proposed modification to the target SFP, when the remaining subsistence duration for the target SFP is below a predefined SFP subsistence period.

7. The method of claim 1, wherein an impact from the at least one impact on an associated SFP is determined based on at least one of load and congestion level on the associated SFP during a past predefined time duration and average traffic and traffic spikes coming from the target SFP.

8. The method of claim 1, wherein, for an associated SFP from the at least one associated SFP, the predefined action criteria comprise:
   identifying a set of actions capable of nullifying each of the plurality of impacts for the associated SFP;
   removing at least one action from the set of actions, wherein the at least one action reverses the effect of at least one counter action performed within a predefined time duration; and
   determining the optimized set of actions for the associated SFP, wherein the optimized set of actions comprise remaining actions in the set of actions.

9. The method of claim 1, further comprising determining after a predefined assessment time interval, performance of the target SFP and performance of each of the one or more of the at least one associated SFP.

10. The method of claim 9 further comprising extracting learnings based on at least one of performance analysis for the target SFP post reconfiguring and performance analysis of the at least one associated SFP post triggering of the associated optimized set of actions, wherein the learnings are extracted for future optimization of service function paths associated with common service functions.

11. The method of claim 9, further comprising performing at least one corrective action, when performance of at least one of the target SFP and one of the one or more of the at least one associated SFP falls below expected performance criteria.

12. A network device for optimizing service function paths associated with common service functions, the network device comprising:
   at least one processor; and
   a memory communicatively coupled to the processor, wherein the memory stores processor instructions, which, on execution, causes the processor to:
      identify at least one proposed modification to a target Service Function Path (SFP) in response to resolve a trigger event;
      for each of the at least one proposed modification made to the target SFP, determine at least one associated SFP impacted by an associated proposed modification, wherein the at least one associated SFP comprises at least one common service function with the target SFP;
      determine at least one impact on each of the at least one associated SFP impacted by an associated proposed modification from the at least one proposed modification;
      optimize the at least one impact on each of the at least one associated SFP based on predefined impact criteria to generate an optimized set of impacts for each of the at least one associated SFP, wherein, for an associated SFP from the at least one associated SFP, the predefined impact criteria comprises identifying a set of impacts from the at least one impact for the associated SFP, wherein one or more impacts from the set of impacts nullifies effect of one or more remaining impacts in the set of impacts;
      determine at least one action associated with each impact in the optimized set of impacts for each of the at least one associated SFP;
      for each of the at least one associated SFP, optimize the at least one action associated with each impact in the optimized set of impacts based on predefined action criteria to generate an optimized set of actions for each of the at least one associated SFP; and
      reconfigure the target SFP based on a proposed modification from the at least one proposed modification and triggering, for one or more of the at least one associated SFP, an associated optimized set of actions corresponding to the proposed modification.

13. The network device of claim 12, wherein the processor instructions further cause the processor to receive the trigger event requiring modification of the target SFP, wherein the trigger event comprises modification in an associated SFP comprising at least one common service function with the target SFP.

14. The network device of claim 12, wherein the processor instructions further cause the processor to identify the proposed modification from the at least one proposed modification, wherein the proposed modification causes minimum number of impacts on associated SFPs and satisfies a selection criterion, wherein the selection criterion comprises at least one of minimum mandatory changes in associated SFPs and minimum network resource consumption.

15. The network device of claim 12, wherein the processor instructions further cause the processor to determine remaining subsistence duration for the target SFP.

16. The network device of claim 15, wherein to determine the remaining subsistence duration for the target SFP, the processor instructions further cause the processor to:
   determine correlation between total subsistence duration for the target SFP based on a set of network and user parameters;
   determine an average total subsistence duration for at least one SFP comprising at least one same served user common with the target SFP;
   adapt the average total subsistence duration based on estimated network condition and a tuning factor to generate total subsistence duration for the target SFP; and
   determine the remaining subsistence duration by subtracting the time elapsed since the instantiation of the target SFP from the adapted average total subsistence duration.

17. The network device of claim 15, wherein the processor instructions further cause the processor to ignore the at least one proposed modification to the target SFP, when the remaining subsistence duration for the target SFP is below a predefined SFP subsistence period.

18. The network device of claim 12, wherein the processor instructions further cause the processor to determine after a predefined assessment time interval, performance of the target SFP and performance of each of the one or more of the at least one associated SFP.

19. The network device of claim 18, wherein the processor instructions further cause the processor to extract learnings based on at least one of performance analysis for the target SFP post reconfiguring and performance analysis of the at least one associated SFP post triggering of the associated optimized set of actions, wherein the learnings are extracted for future optimization of service function paths associated with common service functions.

20. A non-transitory computer-readable storage medium having stored thereon, a set of computer-executable instructions causing a computer comprising one or more processors to perform steps comprising:

identifying at least one proposed modification to a target Service Function Path (SFP) in response resolve a trigger event;

for each of the at least one proposed modification made to the target SFP, determining at least one associated SFP impacted by an associated proposed modification, wherein the at least one associated SFP comprises at least one common service function with the target SFP;

determining at least one impact on each of the at least one associated SFP impacted by an associated proposed modification from the at least one proposed modification;

optimizing the at least one impact on each of the at least one associated SFP based on predefined impact criteria to generate an optimized set of impacts for each of the at least one associated SFP, wherein, for an associated SFP from the at least one associated SFP, the predefined impact criteria comprises identifying a set of impacts from the at least one impact for the associated SFP, wherein one or more impacts from the set of impacts nullifies effect of one or more remaining impacts in the set of impacts;

determining at least one action associated with each impact in the optimized set of impacts for each of the at least one associated SFP;

for each of the at least one associated SFP, optimizing the at least one action associated with each impact in the optimized set of impacts based on predefined action criteria to generate an optimized set of actions for each of the at least one associated SFP; and reconfiguring the target SFP based on a proposed modification from the at least one proposed modification and triggering, for one or more of the at least one associated SFP, an associated optimized set of actions corresponding to the proposed modification.

* * * * *